(12) United States Patent
Darthenay et al.

(10) Patent No.: US 12,386,472 B2
(45) Date of Patent: Aug. 12, 2025

(54) CAPACITIVE TOUCH SCREENS

(71) Applicant: NXP B.V., Eindhoven (NL)

(72) Inventors: Frederic Darthenay, Luc sur Mer (FR); Jean-Robert Tourret, Cormelles le Royal (FR); Franck Goussin, Blainville sur Orne (FR); Vincent Geffroy, Cuverville (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 18/664,150

(22) Filed: May 14, 2024

(65) Prior Publication Data

US 2024/0393910 A1 Nov. 28, 2024

(30) Foreign Application Priority Data

May 23, 2023 (EP) ..................................... 23305812

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 3/04164* (2019.05); *G06F 3/0448* (2019.05)

(58) Field of Classification Search
CPC .. G06F 3/0446; G06F 3/04164; G06F 3/0448; G06F 3/0412
See application file for complete search history.

(56) References Cited

U.S. PATENT DOCUMENTS

| 9,261,997 | B2 | 2/2016 | Chang et al. |
| 9,603,239 | B2 | 3/2017 | Nishioka et al. |
| 9,881,577 | B2 | 1/2018 | Wang et al. |

(Continued)

FOREIGN PATENT DOCUMENTS

| EP | 2390771 A2 | 11/2011 |
| TW | 101134725 A | 5/2013 |

(Continued)

OTHER PUBLICATIONS

U.S. Appl. No. 18/587,195, Goussin et al., "Touch Panel Location Detection With Different Frequency-Phase Offset Combinations of Electrode Signals," filed Feb. 26, 2024.

(Continued)

*Primary Examiner* — Peter D McLoone

(57) ABSTRACT

A touch screen is disclosed having a length and a height, and comprising interspaced and galvanically isolated first and second arrays of touch pads; wherein the first array of touch pads comprises a plurality of first strings of series-connected touch pads, each first string forming a drive line and extending in a first general direction; wherein the second array of touch pads comprises a plurality of second strings of series-connected touch pads, each second string forming a read line and extending in a second general direction, different to said first general direction; wherein the first general direction and the second general direction are each different from the length direction; and wherein the touch screen is configured for capacitive-based sensing which may be based on a change in a mutual capacitance between individual ones of the drive lines and individual ones of the read lines.

20 Claims, 11 Drawing Sheets

(56) References Cited

U.S. PATENT DOCUMENTS

| | | |
|---|---|---|
| 9,933,898 B2 | 4/2018 | Kim et al. |
| 10,635,238 B2 * | 4/2020 | Kurasawa ............. G06F 3/0446 |
| 2010/0258336 A1 | 10/2010 | Minegishi et al. |
| 2014/0267947 A1 | 9/2014 | Yeh et al. |
| 2019/0220147 A1 * | 7/2019 | Kurasawa ........... G06F 3/04166 |

FOREIGN PATENT DOCUMENTS

| | | | |
|---|---|---|---|
| WO | 2014057252 | A1 | 4/2014 |
| WO | 2014057253 | A1 | 4/2014 |

OTHER PUBLICATIONS

U.S. Appl. No. 18/595,499, Darthenay et al., "Touch Panel System Using Modulated Signals as Drive Signals," filed Mar. 5, 2024.
U.S. Appl. No. 18/675,524, Raschbacher et al., Test Methods for Capacitive Touch Screens, and Capacitive Touch Screen Assemblies, filed May 28, 2024.

\* cited by examiner

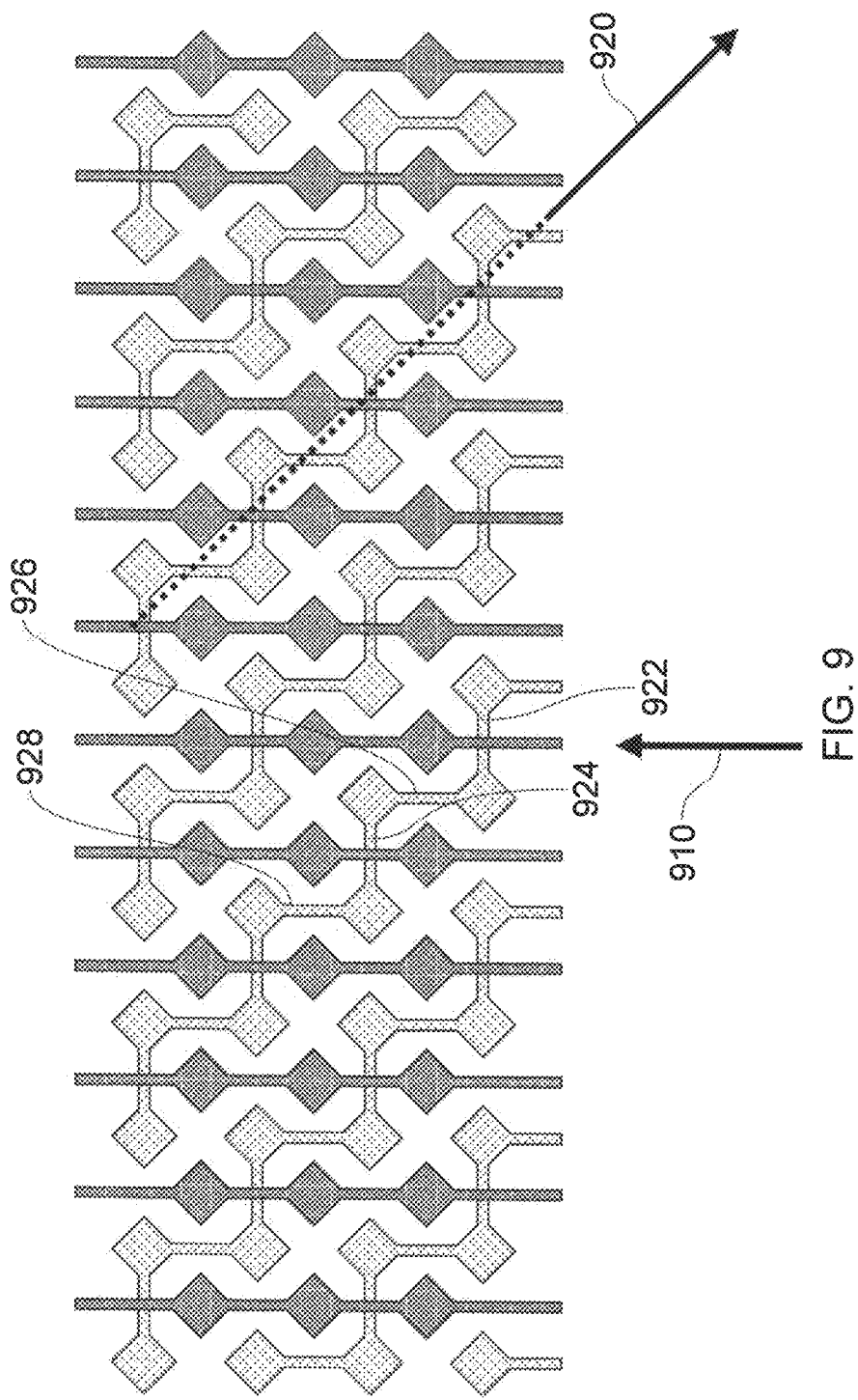

CAPACITIVE TOUCH SCREENS

CROSS-REFERENCE TO RELATED APPLICATIONS

This application claims the priority under 35 U.S.C. § 119 of European Patent application no. 23305812.2, filed on 23 May 2023, the contents of which are incorporated by reference herein.

FIELD

The present disclosure relates to capacitive touch screens and methods of operating the same.

BACKGROUND

In general terms, capacitive touch screens operate by sensing a change in two electrodes in the event that the screen is touched. In order to identify the location of the touch on the screen, is known to use a matrix of electrodes. As the size of touch screens increases, the electrical paths become longer and losses larger. One way of solving this problem is to use multiple individual screens; another is to separate a large screen into smaller sections: however, it would be desirable to be able to reliably sense a large screen.

SUMMARY

According to a first aspect of the present disclosure, there is provided a touch screen having a length in a length direction and a height in a height direction, the touch screen comprising a first array of touch pads interspaced with a second array of touch pads, the second array of touch pads being galvanically isolated from the first array; wherein the first array of touch pads comprises a plurality of first strings of series-connected touch pads, each first string forming a drive line and extending in a first general direction; wherein the second array of touch pads comprises a plurality of second strings of series-connected touch pads, each second string forming a read line and extending in a second general direction, different to said first general direction; wherein the first general direction and the second general direction are each different from the length direction; wherein the touch screen is configured for capacitive-based sensing. The height direction may by orthogonal to the length direction. In other embodiments the height direction is not at 90° to the length direction. By providing the drive lines and read lines at an angle to the length direction, it may be possible to reduce the worst case length of a path required for capacitive measurements, thereby reducing the impedance of the path by resistance or and/or self capacitance with an underlying panel. In turn this may have a beneficial effect on signal-to-noise ratio (SNR). The capacitive based sensing is generally based on a change in a mutual capacitance between individual ones of the drive lines and individual ones of the read lines, however, self-capacitance changes may also be used for the sensing.

In one or more embodiments, the mutual capacitance between individual ones of the drive lines and individual ones of the read lines comprises capacitance components between neighbouring ones of the first and second array of touch pads. The touch pads may be configured and arranged in order to increase or to optimise this mutual capacitance.

In one or more embodiments, the length is greater than the height. Although the present disclosure is not dependant on the aspect ratio of the screen or it's form factor, the disclosure is particularly beneficial for a touch screen having a high aspect ratio, since the path length reduction generally increases, with an increase in the aspect ratio of the screen.

In one or more embodiments, the change in capacitance comprises a perturbation of electric field lines between neighbouring touch pads. Such a perturbation of the electric field may come about, for example, due to the presence of a foreign object such as a user's finger either in direct contact with or proximal to one or more of the neighbouring touch pads. In some circumstances the foreign object may span a touch pad of the first plurality and the touch pad of the second plurality.

In one or more embodiments touch pads of the first array and of the second array each comprise a diamond shape, wherein each diamond shape on a drive line has edges parallel to a neighbouring diamond on a read line. A diamond-shaped may be particularly suited to interleaved first and second arrays or grids of touch pads. In other embodiments the touch pads may have a different configuration, such as a parallelogram or a rhombus. Although not required, the touch pads may have straight edges, in close proximity to a neighbouring straight edge of a neighbouring touch pad in order to provide a higher permittivity thereby providing a larger capacitance than would be the case absent such a close proximity.

In one or more embodiments, each first string extends in a straight line in the first general direction, and each second string extends in a straight line in the second general direction. In other embodiments, the segments providing series connections between neighbouring touch pads on a respective drive line or read line may include curves, or straight segments at an angle to each other. In particular, but without limitation the straight segments may form a staircase configuration.

In one or more embodiments, an angle between the first general direction and the length direction is within a range of 25° to 65°. Such embodiments may include embodiments in which the first general direction is at 45° to the length direction.

In one or more embodiments, each first string is connected to a respective drive circuit, and each second string is connected to a respective read circuit. In such embodiments, in particular where there is a one-to-one relationship between the first strings and the drive circuits, and the second strings and the read circuits, it may be possible that the location of a touch event on the screen may be determined without ambiguity.

In one or more embodiments, at least one drive circuit and at least one read circuit are located along a same long edge of the touch screen. Providing both the first and second general directions at an angle to the length direction may provide for greater flexibility in the positioning of drive circuits and read circuits around the perimeter of the touch screen.

In one or more embodiments, at least one drive circuit is located along a long edge of the touch screen, and at least one read circuit is located along an opposite long edge of the touch screen. Without limitation, this may negate a requirement to include one or both of drive circuits and read circuits along a short edge of the touch screen.

In or more embodiments a drive circuit is connected to a plurality of drive lines. By connecting a same drive circuit to a plurality of drive lines, the frequency associated with that drive circuit may be reused in multiple regions of the display.

In one or more embodiments the of strings of series-connected touch pads, are comprised of an electrically conductive material. In some such embodiments the of strings of series-connected touch pads, are comprised of ITO.

The touch screen may further comprise further comprise a liquid crystal display unit. In such embodiments, the touchscreen may also be referred to as a touch display unit.

According to a second aspect of the present disclosure, there is provided a touch screen comprising an arrangement of a plurality of drive lines galvanically isolated from a plurality of read lines and having a matrix of intersections therebetween, the touch screen having a length in a length direction and a height in a height direction, which may be orthogonal to the length direction; wherein the drive lines propagate in a first general direction, and the read lines propagate in a second general direction; wherein the first general direction and the second general direction are each different to the length direction; and wherein each of the drive lines and each of the read lines is shorter than the length; and wherein the touch screen is configured for capacitive-based sensing based on a change in a mutual capacitance between individual ones of the drive lines and individual ones of the read lines.

In one or more embodiments, the mutual capacitance results from a proximity of the individual drive lines to the individual read line proximal to an intersection therebetween.

In one or more embodiments, the first general direction is perpendicular to the second general direction.

In one or more embodiments, each of the drive lines and each of the read lines is shorter than the length.

In one or more embodiments each of the drive lines and each of the read lines have an increased thickness, between intersections, thereby reducing a separation between the respective drive line and respective read line.

In one or more such embodiments the increased thickness comprises a diamond shape, wherein each diamond shape on a drive line has edges parallel to a neighbouring diamond on a read line.

In one or more embodiments the first general direction is perpendicular to the second general direction and increased thickness comprises a square, wherein each square on a drive line has edges parallel to a neighbouring diamond on a read line.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which

FIG. 9 illustrates, schematically, a geometrical arrangement of the drive and read lines according to one or more other embodiments;

Figure 1:
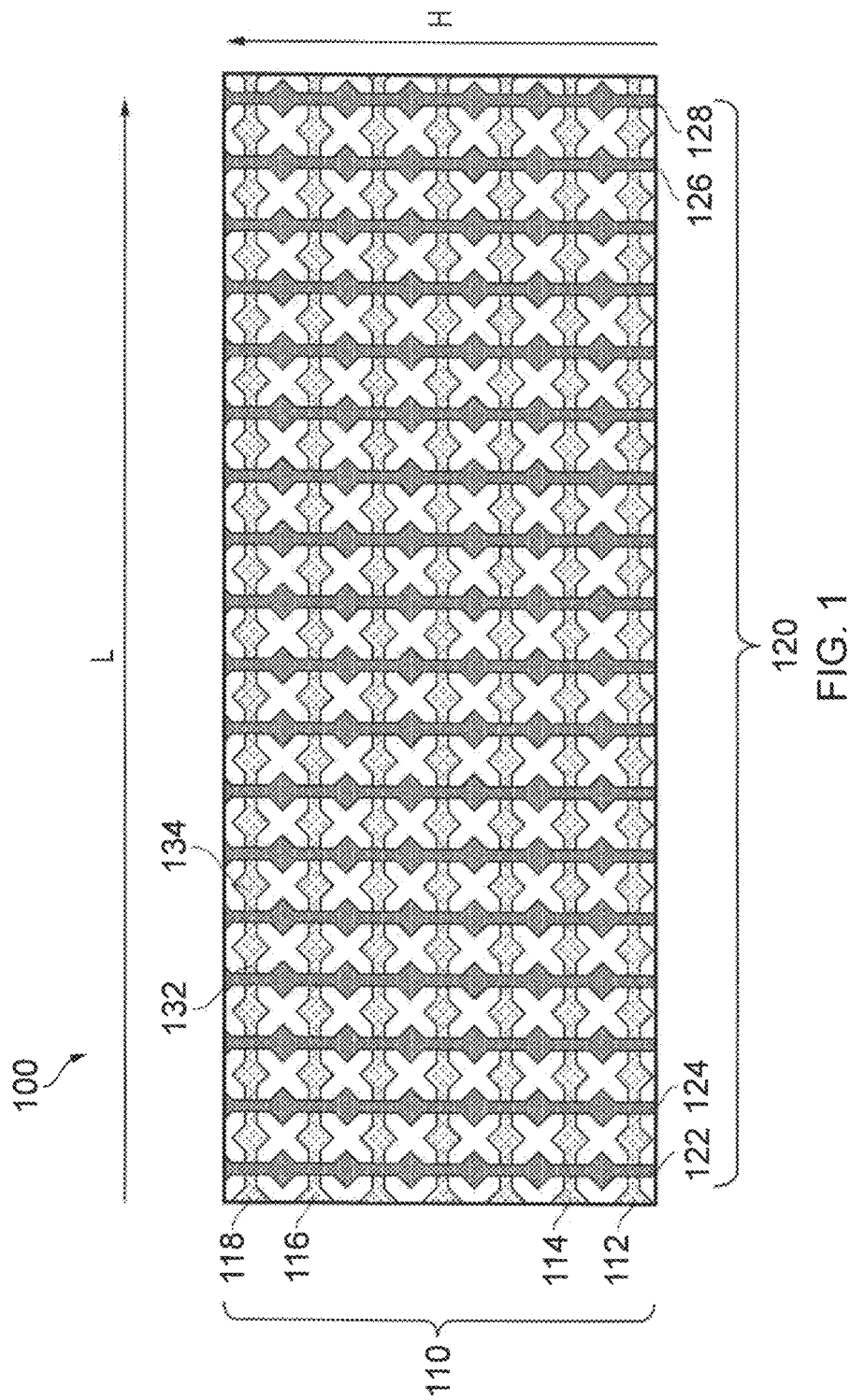
FIG. 1 illustrates, schematically, a multi-electrode matrix of a touch screen.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

FIG. 1 illustrates, schematically, a multi-electrode matrix of a touch screen 100. The touch screen is generally rectangular, although it may be square, or be of a different shape, for instance having bevelled corners. The screen is shown having a length L, and a height H. Length L may typically be of the order up to a metre or more. Similarly height H may typically be a few centimetres or a few tens of centimetres.

The active area of the screen—that is to say the area which may be sensed—is covered by a two-layer grid of electrodes, or lines. In this example, the active area covers the whole of the screen. A first layer of electrodes 110 comprises individual lines 112, 114 . . . 116, 118 which extend generally along the length L. A second layer of electrodes 120 comprises individual lines 122, 124 . . . 126, 128 which extend generally along the height H. Each of the individual lines comprises a track of generally uniform width 132 along which are positioned touch pads 134. The touch pads are generally wider than the uniform width of the remainder of the line The first layer of electrodes 110 is galvanically isolated from the second of electrodes 120.

Figure 2:
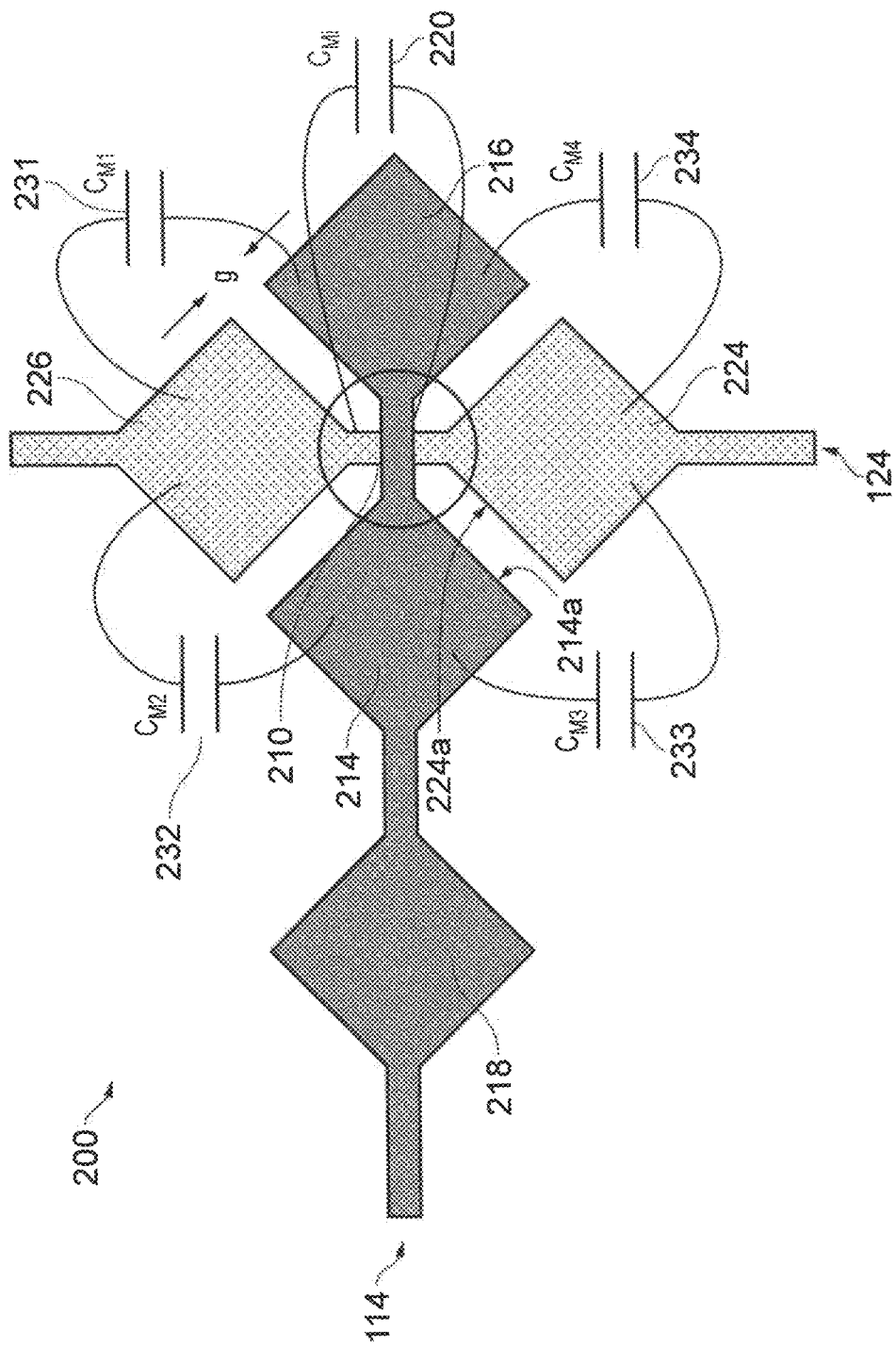
FIG. 2 illustrates, schematically, a cross-point associated with an intersection between a first line of the first layer, and a second line of the second layer.

FIG. 2 illustrates, schematically, a cross-point 200 associated with an intersection 210 between a first line 114 of the first layer, and a second line 124 of the second layer. Where the layers cross—that is to say at the intersection 210—the galvanic isolation between the layers acts as a dielectric within a capacitor $C_{Mi}$, the first line 114 and second line 124 being the respective plates of the capacitor. This capacitor comprises a capacitance component of a mutual capacitance between the first line 114 and the second line 124. The mutual capacitance is increased by other components, in this case four, between neighbouring touch pads. As previously mentioned, line 114 includes touch pads therealong and these include two touch pads 214 and 216 on either side of the intersection 210. Furthermore, line 124 includes touch pads therealong and these include two touch pads 224 and 226 on either side of the intersection 210. This geometrical arrangement results in four additional capacitive components to the mutual capacitance. As shown, touch pad 226 is separated from touch pad 216 by a gap g, which may be arranged to be relatively small, compared with the size of the touch pads. These two touch pads may therefore act as plates of a further capacitor $C_{M1}$ 231. The dielectric of this further capacitor is the material between the plates, including the air or any other material above the surface. Similarly, the combinations of the other touch pads adjacent to the intersection 210 create additional capacitance components $C_{M2}$ 232, $C_{M3}$ 233, and $C_{M4}$ 234. It will be appreciated that the amount other parts of the lines, such as touch pad 218 which are more remote from the intersection may contribute to the mutual inductance effect is generally negligible. Although the dimensions of the lines and touch pads may vary considerably, depending on the size of the screen, for larger screens (over the order of a few tens of cm across), the touchpads may have dimensions of a few mm. For instance, in the case of diamond touchpads the diamonds may have long diagonals in a range between 2 mm and 8 mm or between 3 mm and 5 mm. The pitch of the drive lines may be in a range of 2-10 mm, or 4-8 mm. For smaller panels, the pitch and dimensions may be smaller.

When an object (e.g. a user's finger) comes close to the intersection, the mutual coupling, in particular that provided by the capacitance components $C_{M1}$, $C_{M2}$, $C_{M3}$ and $C_{M4}$ is a changed to some extent, and this can be detected using appropriate touch sensing circuitry. Details are the detection circuitry are well-known to the skilled person and beyond the scope of the present disclosure.

It will be appreciated that shapes other than diamond patterns may be used, but it is generally recognized that this geometric form presents a large mutual capacitance at cross-points, due to the length and proximity of the adjacent edges such as 214a and 224a, hence the rest of this disclosure will focus on this particular pattern, although the disclosure is not limited thereto.

Touch panel rows and lines are commonly organized in a vertical and horizontal scheme, logically resulting in a cross-point defined by the (x, y) location, with x being the column index, and y the row index. The sensing circuitry will generally organize the drivers and receivers following this cartesian convention, for which a physical driver of a row or a column will physically match the row or the column themselves, for practicality and convenience.

Moreover, the lines in the rows and columns not only couple to each other, but also to the bulk of the panel. This coupling is called self-coupling, or self-capacitance. This self-coupling constitutes an impedance seen by the signal drivers. It tends to attenuate the signals transmitted along the lines, as it forms a series of (R, C) low-pass filters, which at some point place a limit on the physical length of the lines, as the signal may be too much attenuated to be accurately detected. This constrains the physical size of the touchscreen.

Figure 3:
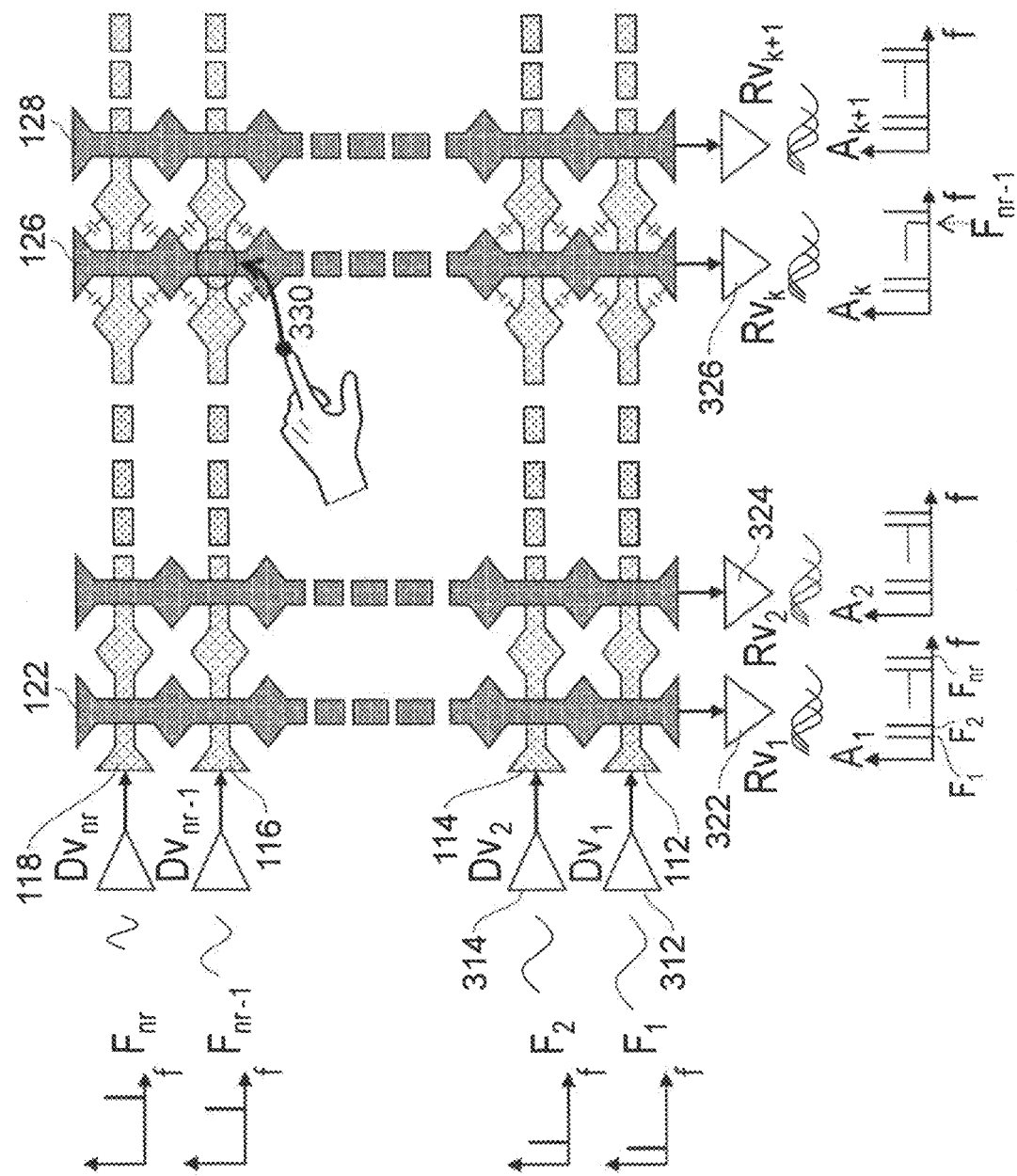
FIG. 3 illustrates an example drive mechanism for a touch screen.

An example drive mechanism for a touchscreen will now be described with reference to FIG. 3. It should be appreciated, the words "columns", "rows" or "lines" may be swapped. In order to aid understanding, a choice will be made to consider a row rather than a column, and vice-versa. For example, "a driver sends a signal on a row", and "a receiver senses a signal on a column" does not mean that the driver has to be attached to a row—it can, instead, be the column, as the skilled person will appreciate. Furthermore, the same applies for the receiver, also referred to as a reader or read circuitry, herein.

Consider a panel of nr rows and nc columns. The rows may be indexed Row1 112, . . . Rowk . . . Rownr 118 and the columns [Col1 122 . . . Colk . . . Colnc, 128. For each row Rowk, there is a unique driver Dvk (being driver Dv1 312, Dv2 314, etc.), driving a signal or tone with a unique frequency Fk. The signal is conveniently, but need not be limited to, a sinewave which may also be referred to as a "tone", since this enables easily mapping of the frequency content of the signal to the row number, and avoids coupling with other tones. The relationship between the frequency is given by Fk+1=Fk+Frate, where Frate is a spacing (in frequency space) between tones and may be linked to a sensing refresh rate of the panel. In other words, the frequencies map on an Frate grid). With each Rowk having a unique frequency Fk (which may also sometimes referred to as a mutual frequency), the consequence is the total occupied spectrum is a function of the number of rows nr, i.e. Fnr=F1+nr*Frate. For each column Colk, there is a unique receiver Rvk, (that is to say, receiver Rv1 322, Rv2 324, etc.).

The range of the signal frequencies F1 . . . Fnr is such that the impedance seen by the drivers is mostly capacitance. However, as the panel size increases, the impedance of the rows or columns becomes increasingly dominated by the frequency poles arising from the resistive nature of the routing between the geometric patterns. For typical screens, the frequency range can be from a few kHz to a few tens of kHz. Above or beyond these limits, the touch sensitivity is altered or reduced due to the effects of the resistance.

All the drivers and receivers are working continuously and at the same time. As a consequence and because of the mutual coupling at each cross-point, each receiver at the end of a respective column sees the frequency content of all the drivers, as illustrated in FIG. 3. In particular, Rv1 322 sees a series of tones, having frequencies of F1, F2, . . . Fnr. Similarly, Rv2 324 sees the same series of tones, having frequencies of F1, F2, . . . Fnr. To aid understanding, the tones are each shown as having the same amplitude, although that is a simplification, since factors such as the path length and the frequency of the tone will affect the amplitude of each received tone.

When a touch, or more generally a "touch event" as will be discussed in more detailed hereinbelow, occurs, such as that illustrated at 330, the local mutual capacitances are affected, and it can be demonstrated that they become smaller. The coupling of the touched row 116 in the case illustrated) to the touched column (Rvk in the case illustrate) at the cross-point loosens or reduces, and the signal content sensed by the receiver Rvk 326 at the column's end will be less for the frequency corresponding to the touched row. In the example illustrated, where there is a touch on row nr−1 and column k, the receiver Rvk will see a smaller signal at Fnr−1.

This sensing technique requires that for each receiver (hence, each column), a frequency content analysis is performed, to discriminate the change due to the touch. The skilled person will appreciate that other discrimination techniques exist, other than the frequency discrimination shown in the example above. For example, orthogonal modulation, such as OFDM, of phase, frequency or amplitude may enable the same discrimination.

The skilled person will also appreciate that the driving scheme can be reinforced by the use of a unique frequency, called Self frequency, provided by all the drivers and receivers, used in addition to or as an alternative drive scheme. It may work well when there is one touch only, however this driving scheme suffers from ghost touches, in the context of multiple touches, as will be familiar to the person skilled in the art.

Figure 4:
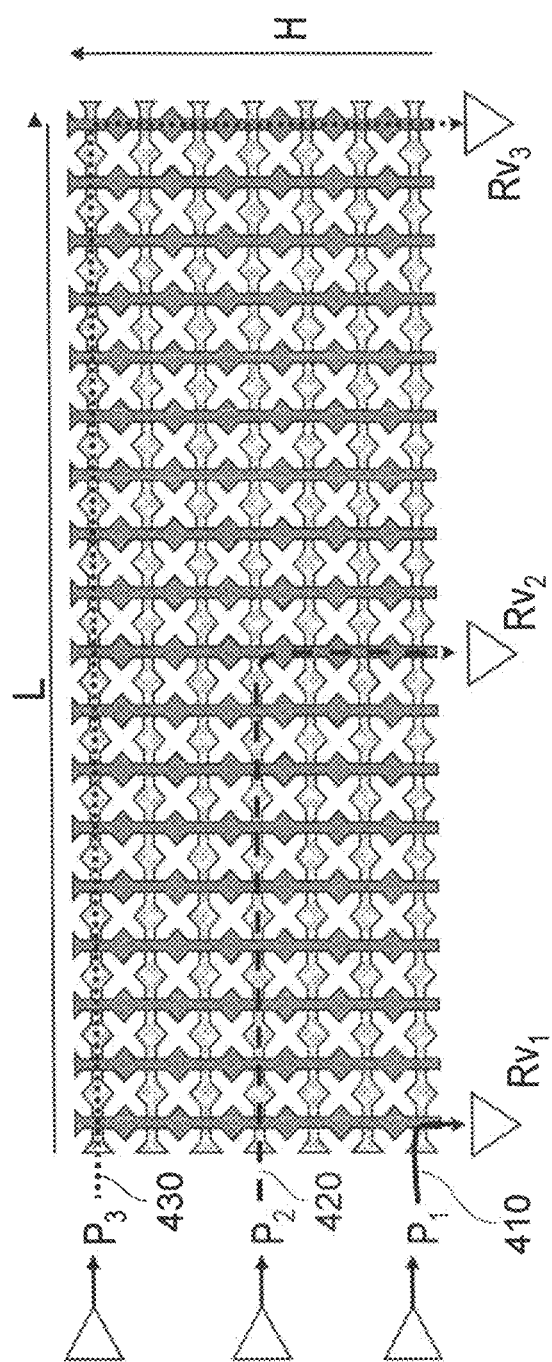
FIG. 4 shows three different mutual capacitive coupling cards paths in a touch screen.
Figure 5:
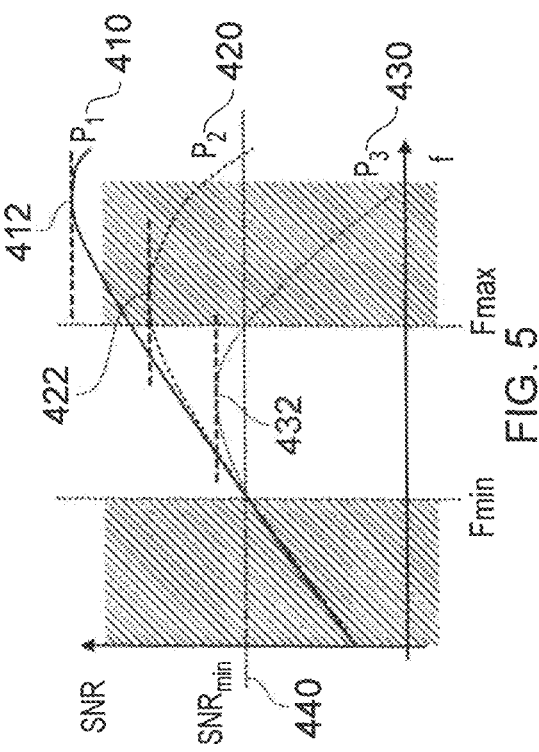
FIG. 5 the corresponding Signal to Noise Ratio for each of the paths shown in FIG. 4.

As the screen size increase, the signal attenuation increases. FIG. 4 shows 3 different paths 410, 420 and 430 in a panel and FIG. 5 shows the corresponding Signal to Noise Ratio for each, measured at the receiver end, as a function of the driving signal frequency. Path P1 410 is the shortest one, up to P3 430, the longest one. It can be shown that the SNR increases with frequency as long as the line's impedance is dominated by the sum of the self-capacitances. It increases since the impedance of the mutual capacitance at the cross-point between rows and columns gets smaller with frequency, up to a point where the poles formed by the self-capacitances and the series resistances become dominant. Unfortunately, the panel is not uniform from a SNR perspective, the SNR is significantly impacted when lines (rows, columns, or both) become long, as shown in FIG. 5. FIG. 5 plots, schematically, SNR against frequency for each of the three paths P1 410, P2 420 and P3 430.

As can be seen, the peak SNR 412 for the shortest path 410 is higher than that 422 for the intermediate path 420. The lowest peak SNR 432 is for the longest path 430. Moreover, the peak SNR 412 is at a higher frequency than the peaks 422 and 432 for each of the longer paths. A touch sensing system is characterized by its ability to detect a change in the capacitance at a given touch point. A detection can be guaranteed if the SNR of the measured signal is not less than a minimum SNR value, 440 $SNR_{min}$, which may typically be in in the range of about 20 dB.

From FIG. 5 it is apparent that the range of usable operating frequencies, that is to say between a minimum Fmin and a maximum Fmax, is determined by the longest signal path. In addition, the frequency for which the maximum SNR is reached tends to shift down for long lines. This results in three possible disadvantages: firstly, this frequency may be very low and the system may suffer the inherent flicker noise of electronics used to drive and receive the signals (this may be generally a couple of kHz); secondly, the possible frequency range [Fmin ... Fmax] reduces a lot, making the maximum possible mutual frequencies Fnr smaller, and as a consequence the maximum possible number of rows nr—this is a limit for the panel size itself; and thirdly, because the SNR increases with frequency, having to drive the rows with lower frequencies means that the peak SNR may be far less than if would be possible with higher frequencies. With some very large panels, this peak SNR may not even be larger than SNRmin. It would therefore be desirable to minimise or reduce the length of the longest signal path.

Figure 6:
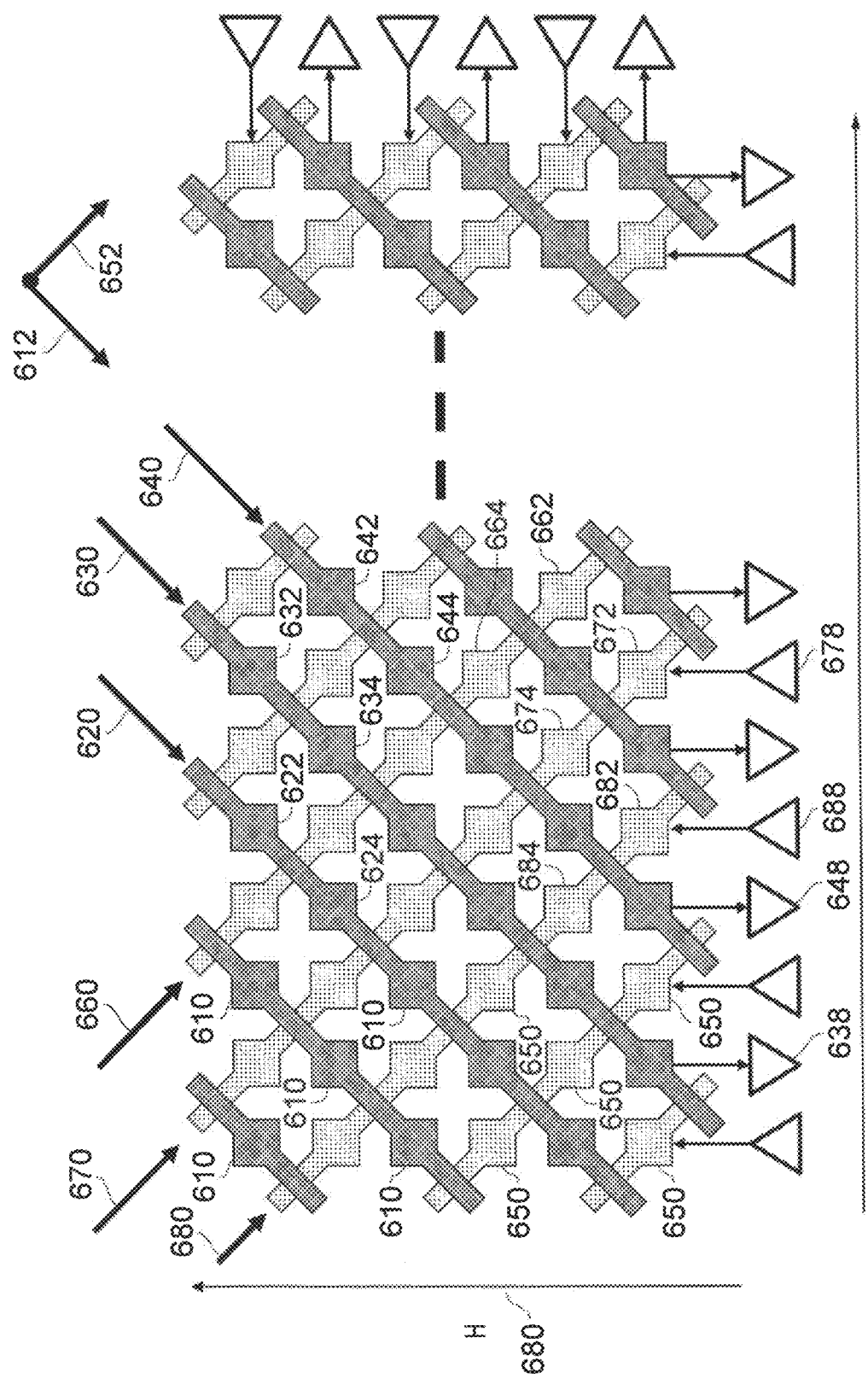
FIG. 6 illustrates, schematically, an arrangement of the electrodes according to one or more embodiments of the present disclosure.

FIG. 6 illustrates, schematically, an arrangement of the electrodes according to one or more embodiments of the present disclosure. In particular FIG. 6 shows a touch screen having a length L in a length direction and a height H in a direction which in this case is orthogonal to the length direction, the length being greater than the height, in this case the length L and height H corresponds to the operable area of the touch screen, and drive and read electronics are outside the operable area. In other embodiments, the length L and height H may correspond to the entire screen.

The touch screen comprises a first array 610 of touch pads interspaced with a second array 650 of touch pads, the second array of touch pads being galvanically isolated from the first array. The touch pads are of an electrically conductive material. Typically, an optically transparent or translucent material such as ITO (indium tin oxide) is used for the touch pad in order to limit the attenuation of light to or from any underlying display. The first array of touch pads comprises a plurality of first strings 620, 630, 640 ... of series-connected touch pads 622, 624 ..., 632, 634 ..., 642, 644, 646 ..., each first string forming a drive line and extending in a first general direction 612. The second array of touch pads comprises a plurality of second strings 660, 670, 680 ..., of series-connected touch pads 662, 664, 666 ..., 672, 674 ..., 682, 684 ..., each second string forming a read line and extending in a second general direction 652, different to said first general direction. By series connected is meant that the electrically conductive touch pads are electrically connected to each other in series. The drive lines thus comprise the first array of touch pads together with interconnecting electrically conductive lines. From one perspective, each drive line may be considered to be an electrically conductive line having bulges regularly spaced there along, each bulge comprising a touch pad.

The first general direction and the second general direction are each different from the length direction. In the embodiment shown in FIG. 6, the first and second direction are each at 45° to the length direction. However as will become apparent hereinafter, other angles are possible. The touch screen is configured for capacitive-based sensing based on a change in a mutual capacitance between individual ones of the drive lines and individual ones of the read lines.

By connecting the drive lines and the read lines at an angle to the length and height of the display, and in particular at an angle to the longest dimension of the display, it is possible to cover the entire operable area uniformly without any of the driver read lines having to extend along the entire length of the display. (In the following discussion, for ease of understanding but without limitation, it will be considered that the length of display is the longer dimension, that is to say, L>H, and that the length direction is 'horizontal' and the height direction is 'vertical'.).

Furthermore, by providing the drive and lead lines at an angle to the screen sides, access to the drive and the read lines may both be provided along the same edge. For example, as can be seen in FIG. 6, the drive electronics or drive circuitry 638 and 648, for driving the drive lines 630 and 640, are provided along the bottom horizontal edge of the screen, as are the read electronics or read circuitry 678 and 688 for reading the read lines 670 and 680.

Although, according to some embodiments and as shown in FIG. 6, the drive circuitry for driving some of the drive lines, and the read circuitry for reading some of the read lines may be located along a vertical edge (that is to say, an edge which is adjacent to and at 90° to the bottom edge), in other embodiments, these drive lines and read lines (that is to say, the drive lines and read lines which do not intersect with the bottom edge) may be accessed from the top edge of the screen.

As shown in FIG. 6. the mutual capacitance between individual ones of the drive lines and individual ones of the read lines may comprise capacitance components between neighbouring ones of the first and second array of touch pads.

As can been seen in FIG. 6., the drive line each extends in a straight line in the first general direction, and each read lines each extend in a straight line in the second general direction. However, in other embodiments this may not be the case.

Figure 7A:
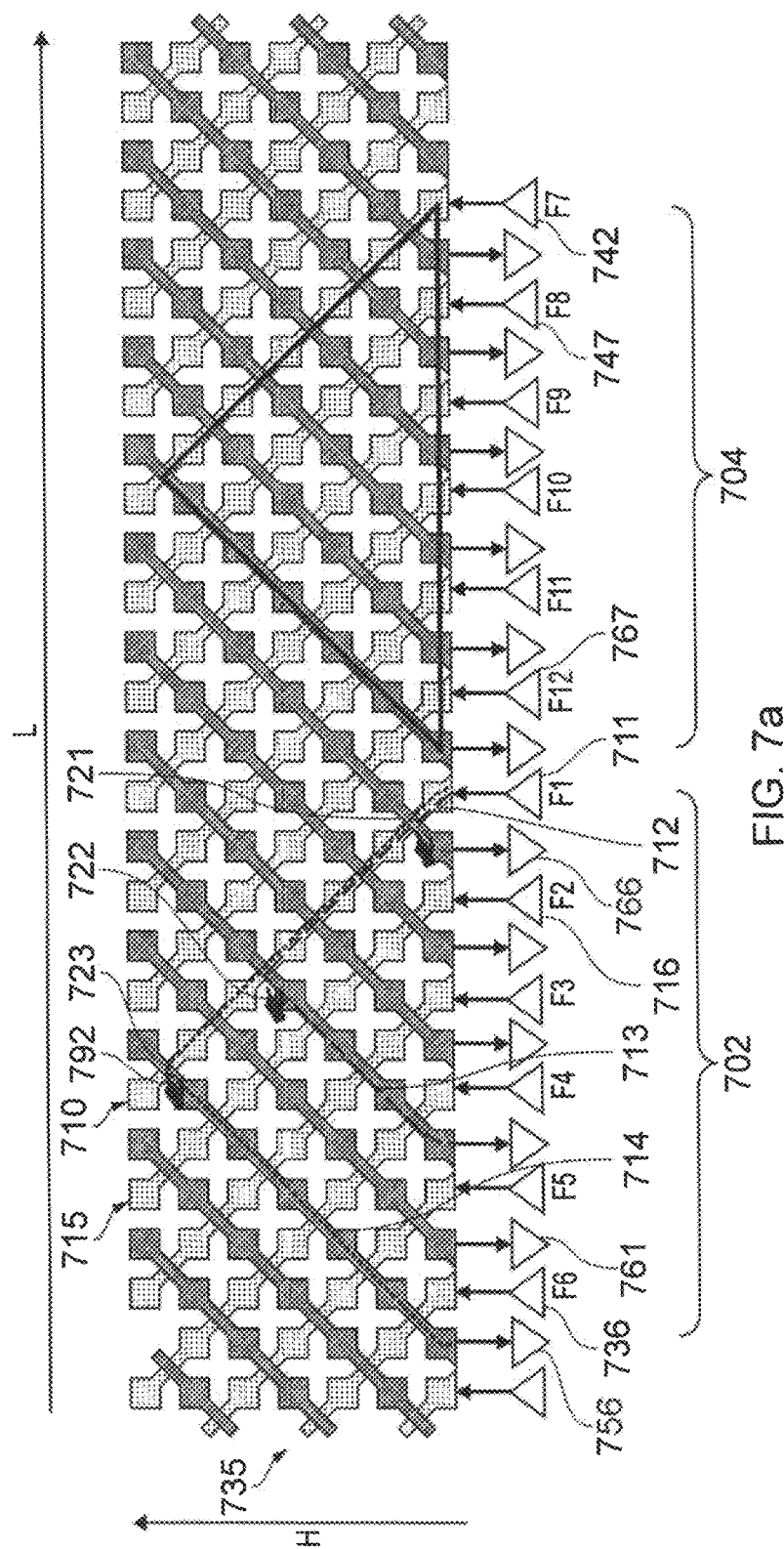
FIG. 7a illustrates, schematically, a touchscreen having a high aspect ratio, in particular such that the length is greater than twice the height, with read and drive lines configured according to embodiments of the present disclosure.

FIG. 7a illustrates, schematically, a touchscreen having a high aspect ratio, in particular such that the length L is greater than twice the height H, with read and drive lines configured according to embodiments of the present disclosure. Similar to FIG. 6, in the arrangement shown, the read lines and drive lines each have a general direction which is at 45° to the height and length sides of the screen. The touch pads between intersections of the drive and read lines are diamonds, in this case with equal diagonals such that they are squares. The panel is dimensioned so as to have seven (or one more than three pairs of) touch pads in any vertical direction, and more than six pairs of touch pads in any horizontal direction. A leftmost set of six drive lines, 710, 715, . . . 735 is driven, by means of transmitters or drivers 711, 716, . . . 736, with respective single-frequency tones at frequencies F1, F2, . . . F6.

In a driving scheme, each 45° diagonal drive line (extending upwards and left) associated with a transmitter or driver has a length of $H\sqrt{2}$ (that is to say H, multiplied by the square root of 2), and the same for the diagonal read lines (extending downwards and left) associated with the receivers or readers. The longest transmit path is then $2*H\sqrt{2}$, as can be seen in the depicted example for F1 and the touch event 792. Any other transmit path is shorter, whatever the length L of the screen. In the limiting case, in which the screen is a perfect square, the maximum length would be $H\sqrt{2}$, (since it would only be a full diagonal, and some of the receiver would be along one height side) while it would be 2H in the case of a convention arrangement in which drive and read lines are arrangement parallel to the respective long and short sides of the screen (which may also referred to as the "cartesian coordinates system" arrangement).

FIG. 7a also illustrates the "over-lap area" from a specific driver tone, in this case that transmitted on drive line 710, from driver 711. A shortest path is that shown at 712, corresponding to a touch event at the cross-point formed adjacent intersection 721, and read from receiver 766; a longer path is that shown at 713, corresponding to a touch event at cross point formed adjacent intersection 722, read from receiver 761; the longest path is that shown at 714, corresponding to a touch event at cross point formed adjacent intersection 723 and read from receiver 756. Moreover, receiver 756 receives tones from each of the transmitters F1 711, F2 716, . . . , F6 736 coupled by mutual capacitance. However, it does not receive tones from any other of the transmitters since there is no mutual capacitive coupling from them. The skilled person will appreciate that there may be some self-coupling due to the coupling through the screen itself but this is generally negligible. Drivers 711, 716, . . . , 736 thus form a first "set 702" of drivers, and the tones F1, F2, . . . F6 used by drivers 711, 716 . . . 736 can thus be reused by another set of drivers 742, 747, . . . 767, further along the length of the screen. The closest set of drivers available for this reuse without mutual capacitive coupling are those shown at F7 through to F12, indicated by 704.

Figure 7B:
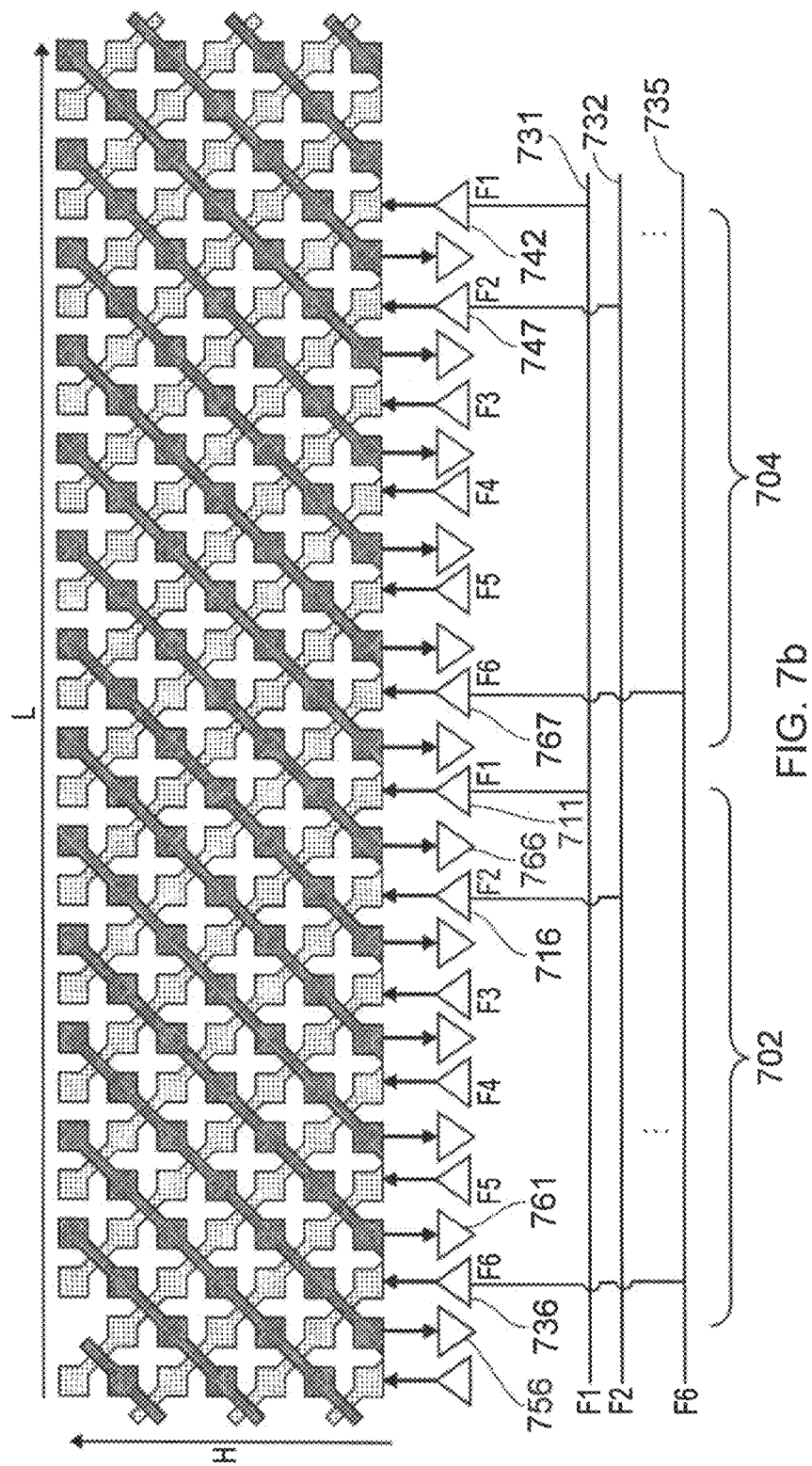
FIG. 7b shows the touchscreen of FIG. 7a, with busses to enable reuse of drive tones, at different sections of the touch screen.

This is illustrated in FIG. 7b, in which the drivers 711 and 742 are connected to a driver 731 for driving a first tone at frequency F1, the drivers 716 and 747 are connected to a second drive bus 732, for driving a second tone at frequency F2 and so on up to drivers 736 and 767 which are connected to a drive bus 735 for driving a highest tone at frequency F6.

It will be appreciated that rounding and border effects may alter a bit those raw quantifiers, and slightly adapted equations for the sake of a given panel should not be considered different from the general case described here.

Figure 8A:
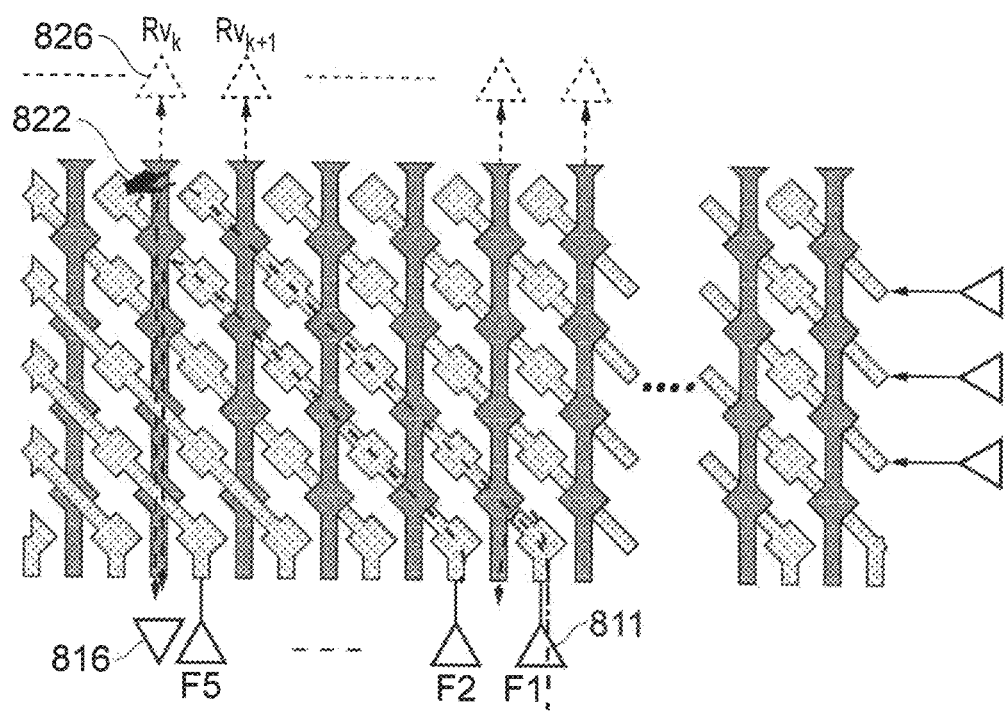
FIG. 8a illustrates, schematically, a geometrical arrangement of the drive and read lines according to one or more other embodiments.

FIG. 8a illustrates, schematically, a geometrical arrangement of the drive and read lines according to one or more other embodiments. In this example, the drive lines are generally vertical—that is to say they are aligned to one side, and in particular the shorter edge, of the touchscreen. The read lines, however, are diagonal. As a result, a longest "path" is that illustrated by a tone F1 transmitted from driver 811 and received at receiver 816. This path has length $(H+H\sqrt{2})$, and the mutual inductance and capacitance of this path may be modified by touch event as shown at 822. As illustrated, the receivers such as 811 may be generally along the same long edge of the screen as the drivers such as 811. Alternatively, they may be positioned along the opposite long edge such as Rvk, as 826.

Figure 8B:
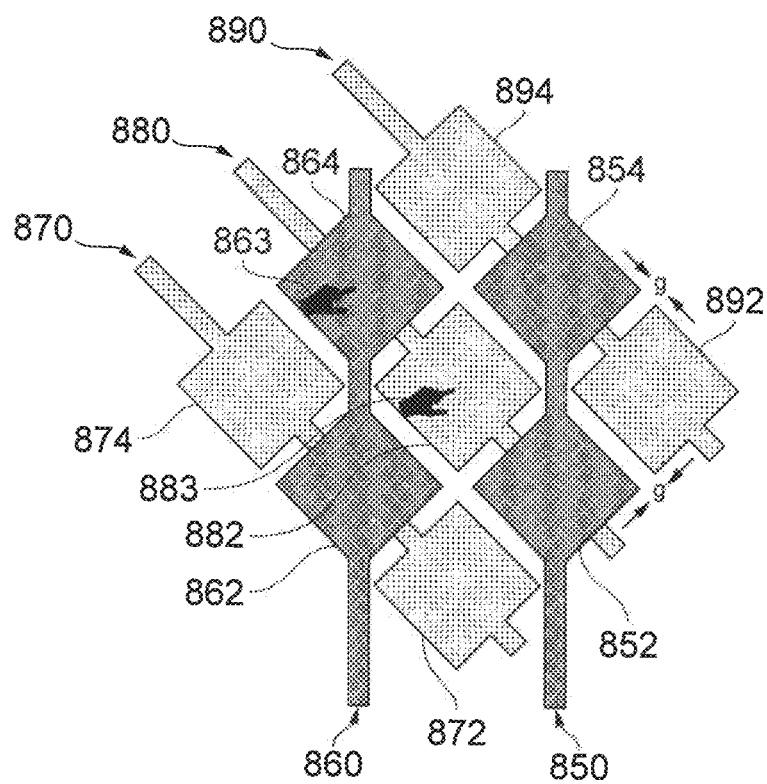
FIG. 8b illustrates a part of the intersecting grids of touch pads and their connections of FIG. 8a in more detail.

FIG. 8b illustrates a part of the intersecting grids of touch pads and their connections in more detail. Shown are two drive lines 850 and 860. Drive line 850 includes thereon two touch pads 852 and 854. Drive line 860 includes thereon to touch pads 862 and 864. The figure also shows three read lines 870, 880, and 890. Shown on read line 870 are two touch pads 872 and 874. Shown on read line 880 is touch pad 882 and shown on read line 890 are touch pads 892 and 894. This arrangement has reduced symmetry compared with that of the embodiment shown in FIG. 7. In particular, the physical intersections between read lines and drive lines are located underneath a subset of the touch pads. In this case they are under touch pads 852 and 854, and 862 and 864, which form part of the drive lines. In contrast, the touch pads 872, 874 etc. on the read lines are further away from the physical intersections. As a result, a touch event such as that illustrated at 883 directly touching or proximal to a read line touch pad such as 882 produces a different perturbation to the mutual capacitance associated with the nearest intersection (or intersections), than a touch event such as that shown at 863 directly touching or proximal to a driveline touch pad such as 864. The skilled person will appreciate that these variations may be accounted for in the read electronics or read circuitry.

FIG. 9 illustrates, schematically, a geometrical arrangement of the drive and read lines according to one or more other embodiments. Topologically, the arrangement of the touch pads corresponds to that shown in FIG. 8a. The direction of the drive lines is vertical, as shown by arrow 910. However, in this figure the routing of the read lines has been changed. The general direction of the read lines is diagonally downwards towards the right as shown by arrow 920, that is to say at 45° to the sides of the screen. This corresponds to embodiment according to FIG. 8. However, the lines themselves have been routed in a staircase fashion having horizontal segments 922, 924 interspaced with vertical segments 926, 928. By this staircase or zigzag routing, the physical intersections between the drive and read lines have been displaced relative to that shown in FIG. 8a, thereby avoiding positioning the intersections beneath touch pads.

Figure 10:
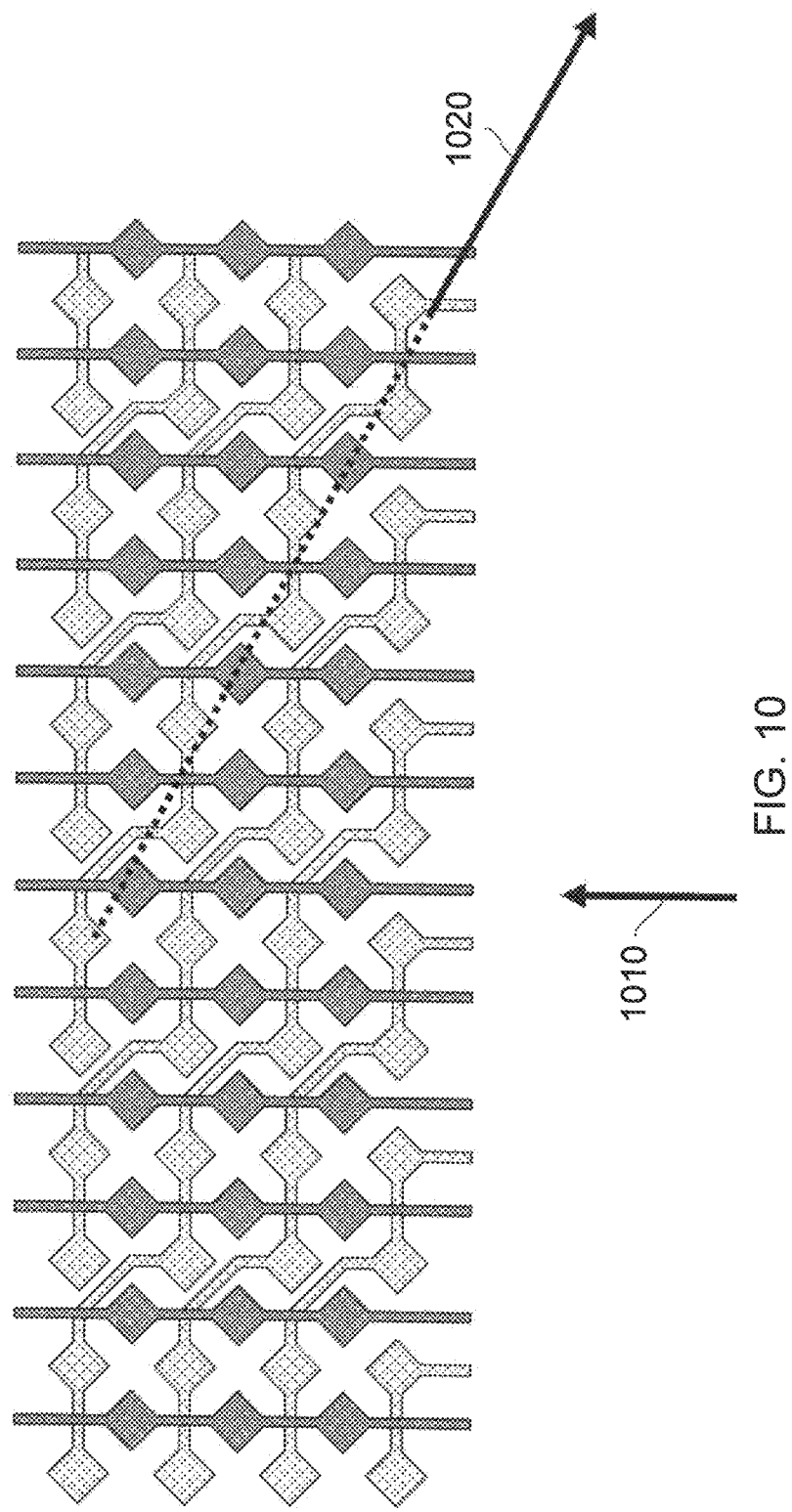
FIG. 10 illustrates, schematically, a geometrical arrangement of the drive and read lines according to one or more other embodiments.

FIG. 10 illustrates, schematically, a geometrical arrangement of the drive and read lines according to one or more other embodiments. The direction of the drive lines is again vertical, as shown by arrow 1010. However, in this figure the routing of the read lines has been changed, relative to that shown in FIG. 9. The general direction of the read lines is downwards towards the right, as shown by arrow 1020, but at a shallower angle. In the embodiment shown, the read line includes two touch pads on any individual (horizontal) row. The general direction of the read line is thus $\arctan(\frac{1}{2})$, or approximately 26° to the horizontal. The read line connections between touch pads may be routed, as shown, to avoid having an intersection under a touch pad of the driveline. Alternatively, the read lines between the pads may be rooted beneath a "drive line" touch pad, similar to that shown in FIG. 8b.

Figure 11:
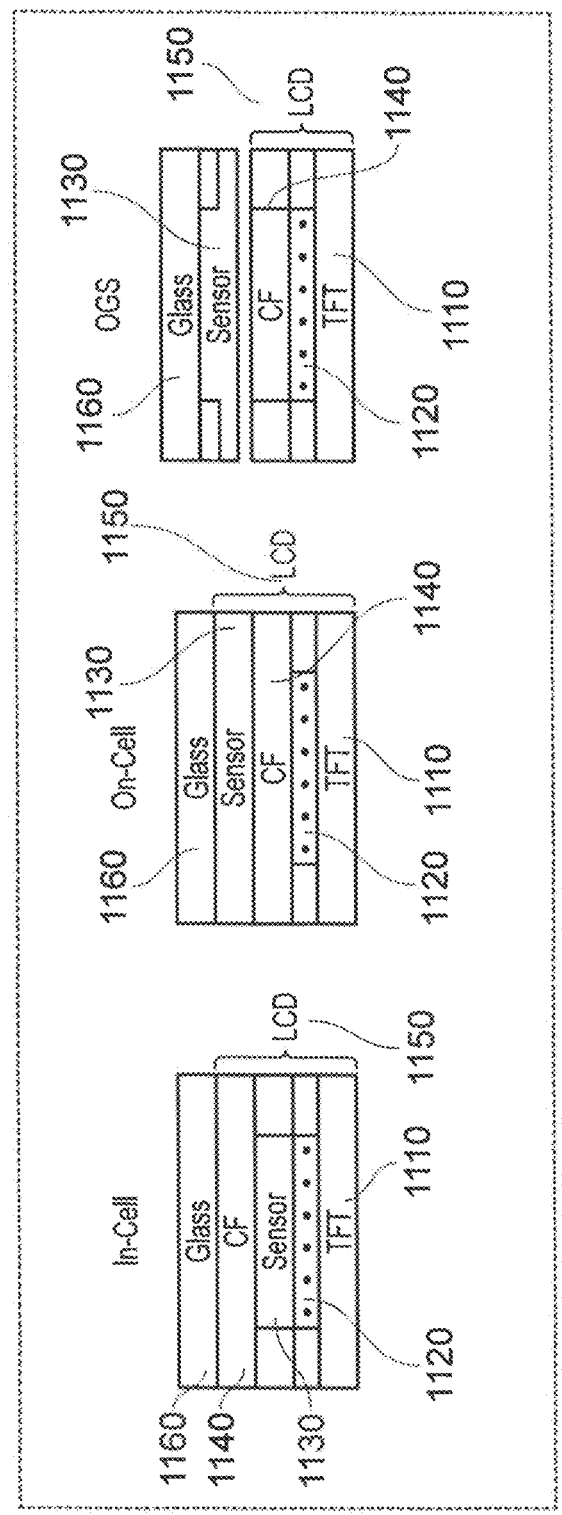
FIG. 11 shows three examples of touchscreen displays (which may also be referred to as "touch panels") to which the present disclosure may be applicable.

FIG. 11 shows three examples of touchscreen displays (which may also be referred to as "touch panels") to which the present disclosure may be applicable. Touch panels are widely used in many aspect of daily lives. They offer a Human Machine Interface (HMI) commonly recognized as a necessary feature along with display panels. There exists a lot of techniques for coupling the touch functionality to the display functionality. In the left-most example, the touch panel is fully integrated inside the display structure, in this instance a liquid-crystal display (LCD) which may be, as shown, implemented using a layer 1110 of thin-film transistors (TFT) defining the display pixels, having thereabove a layer of liquid crystals, such as chiral molecules. The touch sensor 1130 is located underneath the colour filter 1140. Over the LCD 1150 including the sensor is generally provided a protective glass layer 1160. This configuration offers thin and bright screens and may be particularly well-suited for small to medium sized panels.

The centre part of FIG. 11 shows an alternative configuration in which the touch sensor 1130 is located above, but integrated into, the LCD display. The remaining components of the LCD display 1150 and in particular the layer of TFTs 1110 and the layer of electrically active liquid crystal molecules 1120 and the colour filter 1140 are beneath the sensor 1130. Again, a separate protective glass panel 1160 may be provided over the LCD display 1150 and sensor 1130. The manufacturability is much easier for this configuration compared with the in-cell shown on the left, since the sensor manufacture may be separate or decorrelated from the main display assembly. Brightness is attenuated by the touch sensor layer. This technique enables a fast touch sensor design because it starts from an existing display screen. It suits well for medium to large sized panels. On the right of the figure is shown an out-cell configuration, which may also be referred to as One Glass Solution, or OGS: this technology consists of mounting a touch sensor array 1130 on the LCD 1150, both protected by a layer of glass 1160 on which the touch panel layers are directly deposited.

As used herein, a touch events refers to an event in which a user touches one or more touch pads or approaches the one or more touch pads sufficiently closely for a change in the mutual capacitance between a driveline and a read line to be detectable. As such, a touch event need not include touching, or making direct contact with the pad itself, but encompasses touching or making contact with any protective overlayer which may be present, or even coming into close proximity with the touch pad or any protective overlayer.

From reading the present disclosure, other variations and modifications will be apparent to the skilled person. Such variations and modifications may involve equivalent and other features which are already known in the art of large touch screens, and which may be used instead of, or in addition to, features already described herein.

In the sensing technique described above, in which the signals are sine waves, or tones, at separate frequencies at each receiver (hence, each column), a frequency content analysis is performed, to discriminate the change due to the touch. The skilled person will appreciate that other discrimination techniques exist, other than the frequency discrimination shown in the example above. For example, orthogonal modulation, such as O'F'DM (orthogonal 'frequency' division multiplexing), of phase, frequency or amplitude may enable the same discrimination. Furthermore, other signals may be used that simple single-frequency tones. For example, each row may be driven by a modulated signal, each row being endowed with its own modulation parameters for a given modulation type, such as phase modulation, FM modulation, CHIRP modulation. In general, each transmitted signal is orthogonal to the others, although the skilled person will appreciate that full orthogonality may not be required, and in particular it may be possible to process the signal, for example by a decorrelation matrix, and leave in some off-diagonal residual signal. The signals may then be considered to be pseudo-orthogonal. In the event that a modulation scheme is used instead of mutual frequencies, then the occupied spectrum may a function of the modulation index, rather than a function of the number of rows, which is less constraining. Such a driving scheme, with a modulation, may be as follows: drive all the rows with a unique modulation signal, called Fmod_self for example. On each individual row k, a modulation called Fmod_mut_k which is unique to the driven row, is added. Moreover, all the columns may be driven with the self-modulating frequency with Fmod_self Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

It is noted that one or more embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Features which are described in the context of separate embodiments may also be provided in combination in a single embodiment. Conversely, various features which are, for brevity, described in the context of a single embodiment, may also be provided separately or in any suitable subcombination.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims. Furthermore, the word "may" is used in a permissive sense (i.e., meaning having the potential to), rather than the mandatory sense (i.e., meaning must). Similarly, the words "include," "including," and "includes" mean including, but not limited to.

The invention claimed is:

1. A touch screen having a length in a length direction and a height in a height direction,
   a first array of touch pads interspaced with a second array of touch pads, the second array of touch pads being galvanically isolated from the first array;
   wherein the first array of touch pads comprises a plurality of first strings of series-connected touch pads that are electrically connected, each first string forming a drive line and extending in a first general direction;
   wherein the second array of touch pads comprises a plurality of second strings of series-connected touch pads that are electrically connected, each second string forming a read line and extending in a second general direction, different to said first general direction;

wherein the first general direction and the second general direction are each different from the length direction;

wherein the touch screen is configured for capacitive-based sensing based on a change in a mutual capacitance between individual ones of the drive lines and individual ones of the read lines;

wherein the drive line is arranged to drive a signal to a plurality of touch pads; and wherein an output of the read line is arranged to indicate change in capacitance at a plurality of different touch points along the read line based on the signal driven by the drive line.

2. The touch screen according to claim 1, wherein the mutual capacitance between individual ones of the drive lines and individual ones of the read lines comprises capacitance components between neighbouring ones of the first and second array of touch pads.

3. The touch screen according of claim 2, wherein the length is greater than the height.

4. The touch screen of claim 1, wherein touch pads of the first array and of the second array each comprise a diamond shape, wherein each diamond shape on a drive line has edges parallel to a neighbouring diamond on a read line.

5. The touch screen of claim 1, wherein each first string extends in a straight line in the first general direction, and each second string extends in a straight line in the second general direction.

6. The touch screen of claim 1, wherein an angle between the first general direction and the length direction is within a range of 25° to 65°.

7. The touch screen of claim 1, wherein each first string is connected to a respective drive circuit, and each second string is connected to a respective read circuit.

8. The touch screen of claim 7, wherein at least one drive circuit and at least one read circuit are located along a same long edge of the touch screen.

9. The touch screen of claim 8, wherein at least one drive circuit is located along a long edge of the touch screen, and at least one read circuit is located along an opposite long edge of the touch screen.

10. The touch screen of claim 8, wherein a drive circuit is connected to a plurality of drive lines.

11. The touch screen according to claim 1, wherein the of strings of series-connected touch pads, are comprised of an electrically conductive material.

12. The touch screen according to claim 11, wherein the of strings of series-connected touch pads, are comprised of ITO.

13. The touch screen according to claim 1, further comprising a liquid crystal display unit.

14. A touch screen, comprising an arrangement of a plurality of drive lines galvanically isolated from a plurality of read lines and having a matrix of intersections therebetween, the touch screen having a length in a length direction and a height in a height direction orthogonal to the length direction;

wherein the drive lines propagate in a first general direction, and the read lines propagate in a second general direction;

wherein the first general direction and the second general direction are each different to the length direction; and wherein each of the drive lines and each of the read lines is shorter than the length; and wherein the touch screen is configured for capacitive-based sensing based on a change in a mutual capacitance between individual ones of the drive lines and individual ones of the read lines;

wherein a drive line is arranged to drive a signal to a plurality of electrically connected touch pads along the drive line; and wherein a read line is arranged with a plurality of electrically connected touch pads and an output of the read line indicates a change in capacitance at a plurality of different touch points along the read line based on the signal driven by the drive line.

15. The touch screen as claimed in claim 14, wherein the mutual capacitance results from a proximity of the individual drive line to the individual read line proximal to an intersection therebetween.

16. The touch screen as claimed in claim 15, wherein each of the drive lines and each of the read lines have an increased thickness, between intersections, thereby reducing a separation between the respective drive line and respective read line.

17. The touch screen as claimed in claim 16, wherein the increased thickness comprises a diamond shape, wherein each diamond shape on a drive line has edges parallel to a neighbouring diamond on a read line.

18. The touch screen as claimed in claim 16, wherein the first general direction is perpendicular to the second general direction and increased thickness comprises a square, wherein each square on a drive line has edges parallel to a neighbouring diamond on a read line.

19. The touch screen as claimed in claim 14, wherein the first general direction is perpendicular to the second general direction.

20. The touch screen as claimed in claim 14, wherein each of the drive lines and each of the read lines is shorter than the length.

* * * * *